(12) United States Patent
Waldhoer et al.

(10) Patent No.: US 10,661,371 B2
(45) Date of Patent: May 26, 2020

(54) SHORT CIRCUIT WELDING METHOD

(71) Applicant: Fronius International GmbH, Pettenbach (AT)

(72) Inventors: Andreas Waldhoer, Pettenbach (AT); Josef Artelsmair, Pettenbach (AT); Manuel Mayer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 16/331,645

(22) PCT Filed: Sep. 8, 2017

(86) PCT No.: PCT/EP2017/072535
§ 371 (c)(1),
(2) Date: Mar. 8, 2019

(87) PCT Pub. No.: WO2018/046633
PCT Pub. Date: Mar. 15, 2018

(65) Prior Publication Data
US 2019/0240758 A1    Aug. 8, 2019

(30) Foreign Application Priority Data

Sep. 9, 2016 (EP) .................................... 16187971

(51) Int. Cl.
*B23K 9/073* (2006.01)
*B23K 9/09* (2006.01)
(Continued)

(52) U.S. Cl.
CPC ............ *B23K 9/0737* (2013.01); *B23K 9/091* (2013.01); *B23K 9/092* (2013.01); *B23K 9/0953* (2013.01); *B23K 9/1056* (2013.01); *B23K 9/124* (2013.01)

(58) Field of Classification Search
CPC .......... B23K 9/09; B23K 9/091; B23K 9/092; B23K 9/095; B23K 9/124; B23K 9/073;
(Continued)

(56) References Cited

U.S. PATENT DOCUMENTS 6,160,241 A    12/2000 Stava et al.
9,012,808 B2    4/2015 Artelsmair et al.
(Continued)

FOREIGN PATENT DOCUMENTS

CN    1266765 A    9/2000
CN    1665633 A    9/2005
(Continued)

OTHER PUBLICATIONS

Japanese Office Action in Japanese Application No. 2019-513365 dated Oct. 29, 2019 with English translation.
(Continued)

*Primary Examiner* — Phuong T Nguyen
(74) *Attorney, Agent, or Firm* — Collard & Roe, P.C.

(57) ABSTRACT

A short circuit welding method with successive welding cycles with a respective arc phase and short circuit phase includes controlling at least the welding parameters welding current and feed speed of a melting electrode and feeding the electrode toward of a workpiece at a predetermined forward final speed at least during part of the arc phase and away from the workpiece at a predetermined rearward final speed at least during part of the short circuit phase. A device carries out this method. A change in the feed speed and a rearward final speed are predetermined and a welding current is controlled to complete the short circuit phase after reaching the rearward final speed and after 3 ms at the latest and repeat every 8 ms at the latest. The welding parameters are controlled such that the welding cycle duration≤8 ms, resulting in a welding frequency≥125 Hz.

9 Claims, 2 Drawing Sheets

Figure 1:
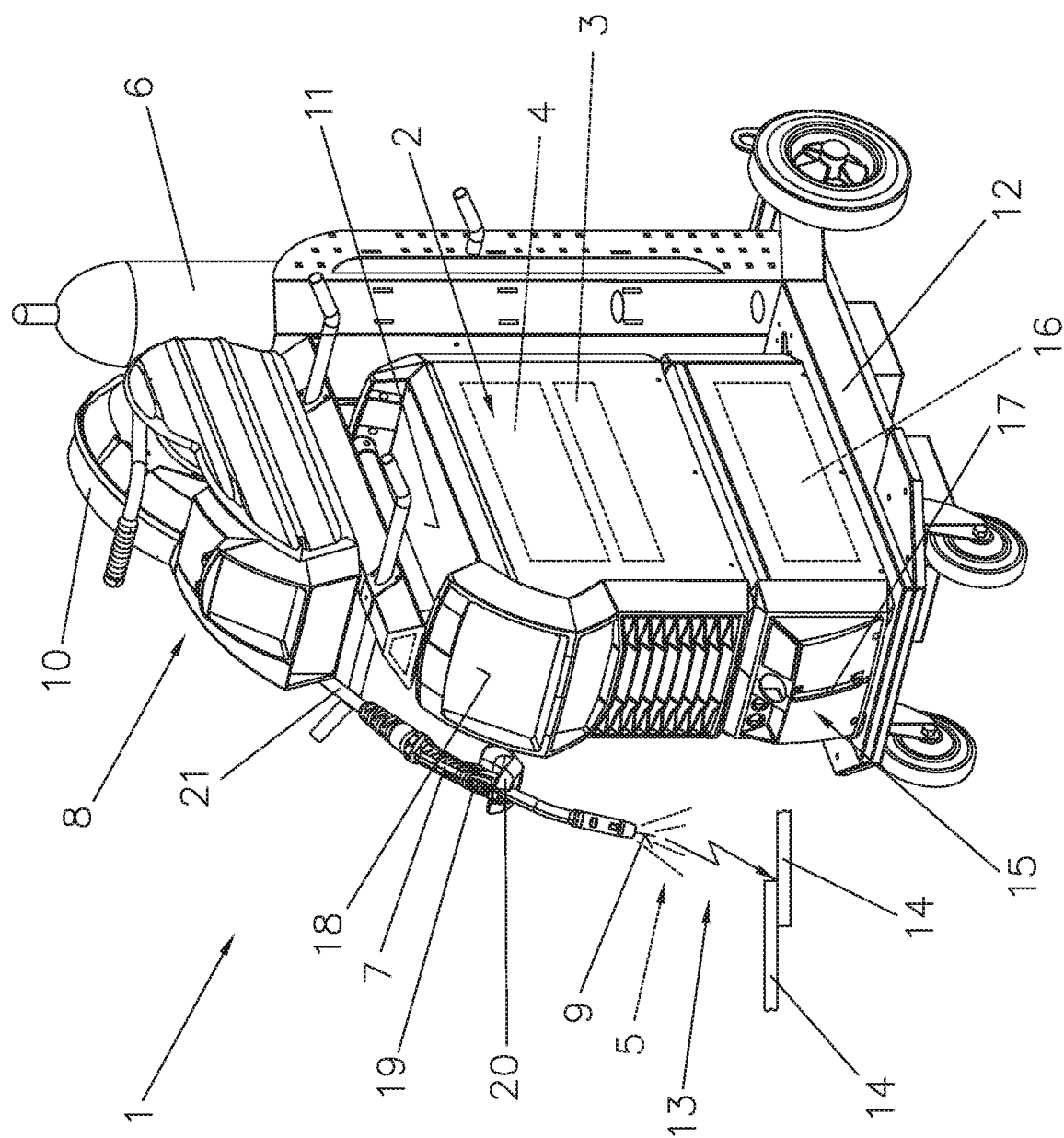

(51) Int. Cl.
  *B23K 9/095* (2006.01)
  *B23K 9/10* (2006.01)
  *B23K 9/12* (2006.01)

(58) Field of Classification Search
  CPC .... B23K 9/125; B23K 9/1336; B23K 9/0953; B23K 9/1056; B23K 9/0737
  USPC ...... 219/125.12, 130.21, 130.5, 130.51, 137, 219/137.7, 137.71
  See application file for complete search history.

(56) References Cited

U.S. PATENT DOCUMENTS

| | | | |
|---|---|---|---|
| 2005/0189335 A1* | 9/2005 | Huismann | B23K 9/073 219/137.71 |
| 2006/0138115 A1* | 6/2006 | Norrish | B23K 9/09 219/137.71 |
| 2016/0303679 A1 | 10/2016 | Ide | |

FOREIGN PATENT DOCUMENTS

| | | |
|---|---|---|
| CN | 101128279 A | 2/2008 |
| CN | 105705286 A | 6/2016 |
| JP | 2005528223 A | 9/2005 |
| JP | 2016144820 A | 8/2016 |
| KR | 10-2016-0105769 A | 9/2016 |
| WO | 2006/089322 A1 | 8/2006 |

OTHER PUBLICATIONS

Chinese Office Action in Chinese Application No. 201780053195.8 dated Aug. 23, 2019 with English translation.
Corrected Version of International Preliminary Report regarding Patentability in PCT/EP2017/072535, dated Jun. 11, 2019, with English translation of relevant parts.
International Search Report of PCT/EP2017/072535, dated Dec. 14, 2017.
Written Office Action of International Searching Authority in PCT/EP2017/072535, dated Dec. 14, 2017, with English translation of relevant parts.
Extended European Search Report dated Mar. 24, 2017 in European Application No. 16187971.3 with English translation of the relevant parts.
Letter to European Patent Office from European Attorney Sonn & Partner regarding PCT/EP2017/072535, dated May 25, 2018, with English translation of relevant parts.
International Preliminary Report regarding Patentability in PCT/EP2017/072535, dated Aug. 23, 2018, with English translation of relevant parts.

\* cited by examiner

SHORT CIRCUIT WELDING METHOD

CROSS REFERENCE TO RELATED APPLICATIONS

This application is the National Stage of PCT/EP2017/072535 filed on Sep. 8, 2017, which claims priority under 35 U.S.C. § 119 of European Application No. 16187971.3 filed on Sep. 9, 2016, the disclosures of which are incorporated by reference. The international application under PCT article 21(2) was not published in English.

The invention relates to a short circuit welding method with successive welding cycles with a respective arc phase and a respective short circuit phase, wherein at least the welding parameters welding current and feed speed of a melting electrode of the short circuit welding method are controlled or set, and the electrode is fed in the direction of a workpiece to be machined at a predetermined forward final speed at least during a part of the arc phase, and is fed away from the workpiece at a predetermined rearward final speed at least during a part of the short circuit phase.

Furthermore, the invention relates to a device for carrying out such a short circuit welding method with successive welding cycles, with a respective arc phase and a respective short circuit phase, comprising a device for controlling at least the welding parameters welding current and feed speed of a melting electrode, and comprising a device for feeding the electrode at least during a part of the arc phase up to a predetermined forward final speed in the direction of a workpiece to be machined, and at least during a part of the short circuit phase up to a predetermined rearward final speed away from the workpiece.

A short circuit welding method of the type of the subject matter is carried out with a melting electrode, which is fed both in the forward direction to the workpiece and in the rearward direction away from the workpiece, with a corresponding device and feed device for the electrode and a welding torch. The welding torch comprises a feed device for the electrode and can be used for manual welding as well as for automated welding. The device for carrying out the short circuit welding method controls at least the welding parameters welding current and feed speed. A welding voltage is used in particular to detect a short circuit between the electrode and the workpiece. Also with the welding voltage the ignition of an arc, i.e. the end of the short circuit, is detected. In a short circuit welding method, welding cycles follow one another in which a short circuit phase and an arc phase alternate periodically. In the short circuit phase, the electrode is fed rearward and the material transition takes place, whereby in the arc phase the electrode is fed forward and the arc introduces heat into the workpiece or electrode.

For example, the US 2006/138115 A1, the US 2005/189335 A1 or the WO 2006/089322 A1 describe such a short circuit welding method and a device for carrying out a short circuit welding method.

With known short circuit welding methods, instabilities occur especially at higher welding speeds and may result in a reduction of the welding quality. There is no indication of achieving a higher welding frequency.

The object of the present invention is to create a short circuit welding method mentioned above, which is characterized by the highest possible stability and high speed and which offers sufficient fusion penetration for workpieces with a thickness of up to 3 mm and a correspondingly high welding quality. Another object is the provision of a device for carrying out a short circuit welding method by which the cited advantages can be achieved.

Disadvantages of known welding methods or devices should be avoided or at least reduced.

The object is achieved by a short circuit welding method in which a change in the feed speed and a rearward final speed are predetermined and a welding current is controlled or set, so that the short circuit phase is completed after reaching the rearward final speed and after 3 ms at the latest and is repeated at the latest every 8 ms, wherein the forward final speed of the electrode is already reduced before the start of the short circuit phase, and the welding parameters are controlled such that the duration of a welding cycle is less than or equal to 8 ms resulting in a welding frequency greater than or equal to 125 Hz. The change in the feed speed, i.e. the acceleration results from the desired duration for the short circuit phase. For an essentially spatter-free short circuit welding method, a method with a forward and backward movement of the electrode is used. This forward and backward movement results in a welding frequency that specifies a period for a welding cycle consisting of a short circuit phase and an arc phase. The welding frequency has an influence on the stability of the short circuit welding method and the welding speed. In order to achieve both with the highest possible quality, a welding frequency greater than 125 Hz is necessary so that a new welding cycle begins or the short circuit phase is repeated every 8 ms at the latest. In order to ensure sufficient heat input into the workpiece, especially with increasing thickness of the workpiece, the arc phase should be as long as possible and accordingly the short circuit phase as short as possible. A short short circuit phase has a duration of less than 3 ms, preferably between 2 ms and 3 ms. During the short circuit phase, the feed direction of the electrode must be reversed from the forward movement during the arc phase to a backward movement during the short circuit phase. By reducing the forward final speed of the electrode before the start of the short circuit phase already, the desired short duration of the short circuit phase or a high welding frequency can be achieved. The speeds for both forward and backward movements depend on the welding application, especially on the material of the workpiece. Typical values are up to 60 m/min for forward and backward movements. The rearward final speed is usually lower than the forward final speed, so that the electrode is fed on average during the short circuit welding method in the forward direction to the workpiece.

Preferably, the electrode is fed at a forward final speed during the arc phase, which essentially corresponds to the rearward final speed during the short circuit phase. If both speeds are the same and the arc phase is longer than the short circuit phase, the electrode is also fed on average in the forward direction during the short circuit welding method. Here the advantage is that on average the electrode is still fed in the direction of the workpiece, since the short circuit phase is considerably shorter than the arc phase.

Advantageously, the electrode is fed at a forward final speed during the arc phase and at a rearward final speed during the short circuit phase in the range between 30 m/min and 60 m/min.

The welding parameters are preferably controlled in such a way that the duration of a welding cycle is less than or equal to 6.6 ms, resulting in a welding frequency of greater than or equal to 150 Hz.

The welding parameters are preferably controlled in such a way that the duration of the arc phase is at least twice as long as the duration of the short circuit phase.

The welding current can be controlled in the form of a current pulse, the duration of which in the short circuit phase is determined as a function of the imminent end of the short circuit phase.

Concerning the welding quality it is advantageous if the welding current during the short circuit phase is initially kept constant at a predetermined value for a predetermined duration, preferably at least 1 ms, and then is reduced.

The change in the feed speed of the electrode is preferably predetermined in a range between 30000 m/min/s and 60000 m/min/s, so that the desired times and speeds can be achieved.

The object according to the invention is also achieved by a device mentioned above for carrying out a short circuit welding method, the control device being designed to reduce the forward final speed of the feed speed of the electrode already before the start of the short circuit phase and to reverse it up to the rearward final speed, and to control the feed speed of the electrode in such a way that the short circuit phase is completed at the latest after 3 ms and is repeated at the latest every 8 ms, resulting in a welding frequency of greater than or equal to 125 Hz. Regarding the advantages that can be achieved thereby, reference is made to the above description of the short circuit welding method.

Preferably, the device for feeding the electrode is formed by a direct drive or a linear drive.

Figure 2:
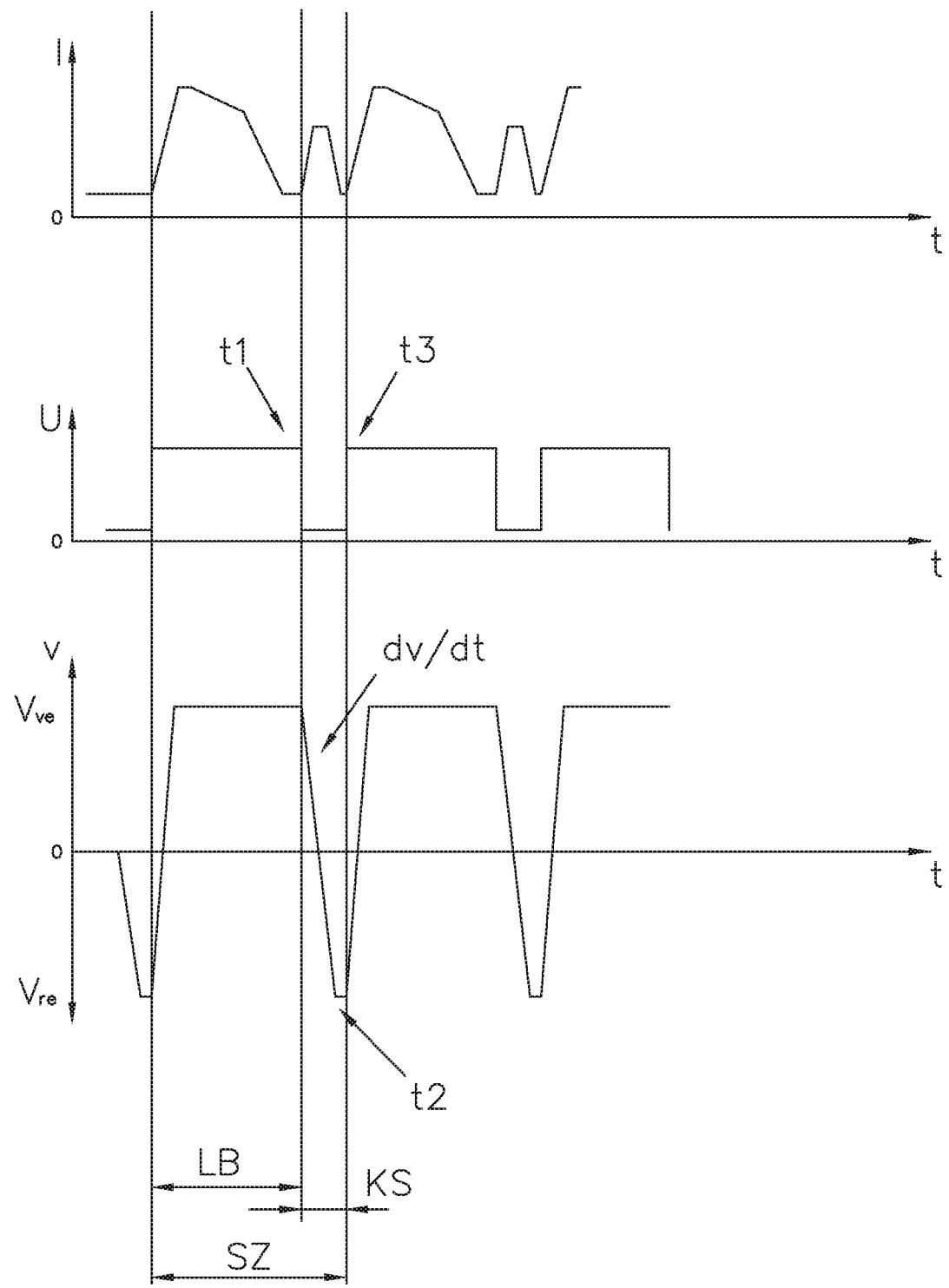

The present invention will be explained in more detail in the appended drawings, in which:

FIG. 1 shows a schematic representation of a welding machine or welding apparatus; and FIG. 2 shows the time course of the welding current I, the welding voltage U and the feed speed v of the electrode during a short circuit welding method according to the invention.

FIG. 1 shows a device 1 for carrying out a welding method or a welding apparatus for various welding processes. The device 1 comprises a current source 2 comprising a power unit 3 arranged therein, a device 4 for controlling welding parameters P, such as the welding current I or the feed speed v of a melting electrode 9 or a welding wire. The control device 4, for example, is connected to a control valve which is arranged in a supply line for a shielding gas 5 between a gas reservoir 6 and a welding torch 7. In addition, the control device 4 can be used to drive a feed device 8 for feeding the melting electrode 9, whereby the electrode 9 is fed from a supply drum 10 to the area of the welding torch 7 via a supply line. The feed means 8 may also be integrated in device 1, in particular in the housing 11 of the power source 2, and not, as shown in FIG. 1, be positioned as an additional device on a carriage 12. It is also possible that the feed device 8 feeds the electrode 9 to the process point outside the welding torch 7.

The welding current I for establishing an arc 13 between the electrode 9 and at least one workpiece 14 is fed via a welding line (not shown) from the power unit 3 of the current source 2 to the electrode 9 and an electrical circuit is formed via the arc 13. The workpiece 14 is connected to the power source 2 via a further welding line (not shown).

To cool the welding torch 7, the welding torch 7 can be connected via a cooling device 15 to a liquid container 16 having a level indicator 17, and a cooling of the welding torch 7 can be achieved.

In addition, the device 1, in particular the power source 2 further comprises an input/output device 18 which can be used to set or call up and display a variety of welding parameters P, operating modes or welding programs. The welding parameters P, operating modes or welding programs set via the input/output device 18 are forwarded to the control device 4, which then controls the individual components of the device 1 or sets the corresponding desired values for the regulation or control. When a corresponding welding torch 7 is used, also adjustment processes can be carried out via the welding torch 7, whereby the welding torch 7 is equipped with a welding torch input/output device 19. The welding torch 7 is preferably connected via a data bus to the device 1, in particular to the power source 2 or the feed device 8.

To start the welding process, the welding torch 7 usually comprises a start switch (not shown), so that the arc 13 can be ignited by actuating the start switch. In order to be protected from exposure to intense heat from the arc 13, it is possible to equip the welding torch 7 with a heat shield 20.

Furthermore, in the exemplary embodiment shown, the welding torch 7 is connected to the device 1 via a hose package 21. In the hose package 21, the individual lines, such as the supply line or lines for the electrode 9, for the shielding gas 5, for the cooling circuit, for the data transmission etc. are arranged from the device 1 to the welding torch 7.

As an example, FIG. 2 shows the time course of the welding current I, the welding voltage U and the feed speed v of the electrode 9 during a short circuit welding method. The short circuit welding method is carried out with the following parameters or values:

Forward final speed $v_{Ve}$: 50 m/min
Rearward final speed $v_{Re}$: 40 m/min
Welding current I in the short circuit phase KS: 120 A
Duration of the short circuit phase KS: on average, 2.5 ms
Welding frequency f: 150 Hz It can be seen from the time courses that the direction of the feed of the electrode in the short circuit phase KS is reversed from the forward feed in the direction of the workpiece at the forward final speed $v_{Ve}$ of 50 m/min to a backward movement away from the workpiece at a rearward final speed $v_{Re}$ of 40 m/min. The feed speed v is reduced before the short circuit KS already, so that the reversal of direction can be carried out more quickly and the electrode is immersed less deeply in the weld pool. For example, the forward final speed $v_{Ve}$ is reduced after having been constant for a period of time or after a certain burning time of the arc. No later than at time t1—i.e. at the start of the short circuit phase KS—a value for the acceleration, i.e. the change in the feed speed dv/dt is given to the device for feeding the electrode or to a motor controller, so that the desired rearward final speed $v_{Re}$ is reached at a time t2.

In the example given in FIG. 2, an acceleration of 40000 m/min/s (667 m/s$^2$) is required for this, which is given to a motor controller associated to the feed device and regulating the feed speed v accordingly. The motor controller thus ensures that the rearward final speed $v_{Re}$ is reached at time t2 in the short circuit phase KS. Once the rearward final speed $v_{Re}$ is reached, the acceleration is set to zero and the feed speed v is maintained, reduced or increased until the short circuit is broken and the arc is ignited.

Whether and how the feed speed v changes after reaching the rearward final speed $v_{Re}$ is determined during the definition of the welding characteristic. A welding characteristic is created according to the requirements of a welding application and mainly depends on the material (Al, CrNi, steel, . . . ), the thickness of the workpiece, and the welding speed.

The acceleration of the feeding of the electrode is predetermined, among other things, like the rearward final speed $v_{Re}$, via the respective welding characteristic curve.

In the short circuit phase KS, the melting electrode is in the weld pool and the droplet is transferred from the end of the electrode to the weld pool. To ensure that the droplet is released in the weld pool during the short circuit phase KS, the welding current I is controlled or adjusted in the form of a current pulse during the short circuit phase KS. The welding current I is controlled or set in such a way that the droplet is not released during the current pulse so that no spatters occur. The amplitude and the course of the welding current I are adapted to the required energy during the short duration of the short circuit phase KS—for one thing, to maintain the temperature of the electrode and, for another thing, as preparation for the droplet release. The value is essentially selected depending on the material of the workpiece. According to FIG. 2, an amplitude of the welding current I of 120 A is kept constant until the end of the short circuit phase KS is directly imminent—for example for 1 ms. To prevent welding spatters during the subsequent droplet release, the current pulse is only terminated shortly before the imminent end of the short circuit phase KS or the amplitude of the welding current I is reduced to a maximum of 100 A, e.g. 50 A. The duration of the current pulse is controlled or set accordingly. The droplet release takes place after this phase—i.e. after the current pulse—and is essentially spatter-free. Whether the current pulse is controlled or set is essentially defined or predetermined with the welding characteristic. The welding current I (amplitude and duration) is either controlled as a function of at least one event or a fixed value is predetermined for the amplitude and duration of the welding current. The time at which the amplitude of the welding current I has reached the reduced value does not necessarily have to depend on time t2. According to FIG. 2, these points in time are essentially identical, but independent of each other. Of course, this can also be predetermined in the welding characteristic curve in such a way that these are dependent on each other.

The imminent end of the short circuit phase KS is essentially determined on the basis of the change in the welding voltage U, as can be seen at time t3. The imminent end of the short circuit phase KS, however, can also be determined in such a way that at the beginning of the short circuit phase KS a resistance is calculated from the actual welding voltage U and the actual welding current I and stored. During the short circuit phase KS, an actual resistance can be continuously determined. If the actual resistance is higher than the stored resistance by a defined factor, the ignition of the arc and the beginning of the arc phase LB are imminent and the welding current I is reduced. However, it is also possible to continuously compare the actual resistance with the previously determined resistance and to evaluate a change or gradient. If the change is essentially abrupt, the ignition of the arc is imminent.

By ascertaining the imminent end of the short circuit phase KS, the acceleration can also be adapted to the feed of electrode in order to achieve the rearward final speed $v_{Re}$ during the short circuit phase KS.

Due to the rearward feeding of the electrode away from the workpiece, the arc is ignited at time t3 as soon as the electrode emerges from the weld pool. Since the droplet has been released already and the welding current I has been reduced already, this takes place without any weld spatter.

The time t3 of the ignition of the arc varies slightly due to the vibrations of the weld pool. The immersion depth of the electrode in the weld pool during the forward feed in the direction of the workpiece and the temperature of the electrode also have an influence. This essentially has no influence on the stability of the welding process, since the amplitude and the duration of the current pulse are controlled as a function of the imminent end of the short circuit phase KS. In this way, the temperature of the weld pool is maintained. With the ignition of the arc and the start of the arc phase LB, the feed direction of the electrode is reversed again or the reversal is initiated and accelerated to the value of the forward final speed $v_{Ve}$, for example to 50 m/min, with an acceleration of 40000 m/min/s, essentially the same as the acceleration to the rearward final speed $v_{Re}$. Likewise, the welding current I is increased with the ignition of the arc, then reduced to a predetermined value and essentially held constant, and then reduced to the end of the arc phase LB when the forward final velocity $v_{Ve}$ of the electrode is reached.

Since the acceleration is predetermined both in the forward direction and in the rearward direction, the mean feed speed v of the electrode, which in sum represents a feed of the electrode in the direction of the workpiece, can be kept essentially constant. The stability of the short circuit welding method can thus be increased.

For such high accelerations (at least up to 60000 m/min/s), feed means having a low mass inertia and a rotor with a maximum diameter of 16.4 mm are required. In addition, the electrode is preferably driven directly by the feed means, i.e. without transmission or gearbox.

For a stable welding process it is important that the same conditions prevail in each welding cycle SZ. For this reason, the rearward final speed $v_{Re}$ must be reached during the short circuit phase KS, so that the same arc length, i.e. the same distance from the workpiece, is always achieved at the subsequent ignition of the arc. For this purpose, a corresponding amplitude for the welding current I during the short circuit phase KS is predetermined for the respective welding application. If the amplitude of the welding current I is selected too high, the electrode could melt through above the surface of the weld pool and an unwanted arc would be ignited. In case of too low an amplitude of the welding current I, the electrode could be preheated insufficiently and poor ignition could result.

In addition to the high acceleration, it is also important for a short short circuit phase KS that the feed speed v of the electrode is relatively high both in the forward direction and in the rearward direction, preferably greater than 30 m/min. When feeding the electrode to the workpiece in a forward direction, the short circuit occurs within shorter time. The reversal of the feed direction should also take place quickly, so that the duration of the short circuit phase KS is not extended significantly. When feeding the electrode away from the workpiece in a rearward direction, it is important that the arc is ignited as quickly as possible and the arc phase LB begins, so that the maximum duration of the short circuit phase KS of 3 ms is not exceeded.

The duration of the arc phase LB defines the desired heat input into the workpiece, which can be increased accordingly by shortening the short circuit phase KS. For example, the arc phase LB is twice as long as the short circuit phase KS.

What is achieved by the short circuit welding method according to the invention is that an essentially constant duration is obtained for the short circuit phase KS and the arc phase LB on the basis of the respective values of the welding characteristic curve. In addition, this is supported by an exact control of the feed speed v via the acceleration and the control of the welding current I.

In addition, higher welding speeds of up to 3 m/min can be achieved with simultaneous high stability of the short circuit welding method. The short circuit welding method according to the invention can also be used for workpiece thicknesses of up to 3 mm, whereby the required fusion penetration is ensured by the longer arc phase LB. Depending on the welding application (e.g. fillet weld, butt weld, etc.), workpieces of a thickness of 2 mm can be welded with a welding speed of 1 m/min or workpieces with a thickness of 0.8 mm with a welding speed of 2 m/min at a welding frequency f between 125 Hz and 170 Hz.

The invention claimed is:

1. A short circuit welding method with successive welding cycles having each an arc phase and a short circuit phase, the method comprising the steps of:
   controlling or setting at least the welding parameters, welding current and feed speed of a melting electrode;
   feeding the electrode in the direction of a workpiece to be machined at a predetermined forward final speed at least during a part of the arc phase;
   feeding the electrode away from the workpiece at a predetermined rearward final speed at least during a part of the short circuit phase;
   predetermining a change in the feed speed and a rearward final speed and controlling or setting the welding current;
   completing the short circuit phase after reaching the rearward final speed and after 3 ms at the latest;
   repeating the short circuit phase at the latest every 8 ms;
   reducing the forward final speed of the electrode before the start of the short circuit phase; and
   controlling the welding parameters in such a way that the duration of a welding cycle is less than or equal to 8 ms, resulting in a welding frequency of greater than or equal to 125 Hz.

2. The short circuit welding method according to claim 1, further comprising the step of feeding the electrode at the forward final speed during the arc phase which corresponds to the rearward final speed during the short circuit phase.

3. The short circuit welding method according to claim 1, further comprising the step of feeding the electrode at the forward final speed during the arc phase and the rearward final speed during the short circuit phase in the range between 30 m/min and 60 m/min.

4. The short circuit welding method according to claim 1, further comprising the step of regulating the welding parameters such that the duration of the welding cycle is less than or equal to 6.6 ms, resulting in a welding frequency of 150 Hz or greater.

5. The short circuit welding method according to claim 1, further comprising the step of controlling the welding parameters such that the duration of the arc phase is at least twice as long as the duration of the short circuit phase.

6. The short circuit welding method according to claim 1, further comprising the step of controlling the welding current in the form of a current pulse, the duration of which is determined in the short circuit phase as a function of the imminent end of the short circuit phase.

7. The short circuit welding method according to claim 1, further comprising the steps of first keeping the welding current constant at a predetermined value over a predetermined duration during the short circuit phase and then reducing the welding current.

8. The short circuit welding method according to claim 7, further comprising the step of keeping the welding current constant during the short circuit phase at the predetermined value over a duration of at least 1 ms.

9. The short circuit welding method according to claim 1, further comprising the step of predetermining the change in the feed speed in a range between 30000 m/min/s and 60000 m/min/s.

* * * * *